US008960791B2

(12) United States Patent
Dry et al.

(10) Patent No.: US 8,960,791 B2
(45) Date of Patent: Feb. 24, 2015

(54) TRIM ATTACHMENT APPARATUS FOR VEHICLE SEATING ASSEMBLY

(71) Applicant: Ford Global Technologies, LLC, Dearborn, MI (US)

(72) Inventors: Alan George Dry, Grosse Pointe Woods, MI (US); Gunnar Groesbeck, Berkley, MI (US); Christian J. Hosbach, Allen Park, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 13/933,626

(22) Filed: Jul. 2, 2013

(65) Prior Publication Data
US 2015/0008716 A1 Jan. 8, 2015

(51) Int. Cl.
| | | |
|---|---|---|
| A47C 31/02 | (2006.01) | |
| A47C 7/24 | (2006.01) | |
| A47C 7/74 | (2006.01) | |
| B60N 2/44 | (2006.01) | |
| B60N 2/68 | (2006.01) | |
| B60N 2/56 | (2006.01) | |

(52) U.S. Cl.
CPC .. B60N 2/44 (2013.01); B60N 2/68 (2013.01); B60N 2/56 (2013.01)
USPC .................. 297/218.3; 297/218.1; 297/218.5; 297/452.42

(58) Field of Classification Search
USPC ................................ 297/218.1–218.5, 452.42
See application file for complete search history.

(56) References Cited

U.S. PATENT DOCUMENTS

| | | |
|---|---|---|
| 5,902,014 A | 5/1999 | Dinkel et al. |
| 6,196,627 B1 | 3/2001 | Faust et al. |
| 6,224,150 B1 | 5/2001 | Eksin et al. |
| 6,682,140 B2 | 1/2004 | Minuth et al. |
| 6,848,742 B1 | 2/2005 | Aoki et al. |
| 7,213,876 B2 | 5/2007 | Stoewe |
| 7,802,843 B2 | 9/2010 | Andersson et al. |
| 7,946,649 B2 | 5/2011 | Galbreath et al. |
| 8,215,714 B2 | 7/2012 | Galbreath et al. |
| 8,733,834 B2 * | 5/2014 | Palmer ........................ 297/218.5 |
| 2009/0295215 A1 | 12/2009 | Galbreath et al. |

(Continued)

OTHER PUBLICATIONS

Alldata, LLC. "Interior-Driver Seat Lumbar Support Repair Procedure—Service Procedure." http://www.alldatadiy.com/alldatadiy/DIY~G~C45827~R0~OD~N/0/138181779/138629620/138629625/138629629/34853741/34850750/42095789/173755430/173755432. Reference: NTB07-095D. Dated Oct. 3, 2011.

(Continued)

Primary Examiner — Rodney B White
(74) Attorney, Agent, or Firm — Vichit Chea; Price Heneveld LLP

(57) ABSTRACT

A vehicle seating assembly that includes a frame structure and a panel coupled with the frame structure that has an occupant support surface. A connection element protrudes from the occupant support surface and borders a predefined area of the occupant support surface. A trim module covers the predefined area and includes an attachment feature extending inward and engaging the connection element to form a seal around the predefined area. A ventilation aperture extends through the panel within the predefined area and an air movement device is coupled with the panel to draw air through the ventilation aperture from an exterior surface of the trim module.

20 Claims, 8 Drawing Sheets

(56) References Cited

U.S. PATENT DOCUMENTS

| | | |
|---|---|---|
| 2010/0038937 A1 | 2/2010 | Andersson et al. |
| 2012/0112515 A1 | 5/2012 | Labish |
| 2012/0274116 A1 | 11/2012 | Palmer |
| 2014/0203603 A1* | 7/2014 | Line et al. .................. 297/218.1 |

OTHER PUBLICATIONS

U.S. Appl. No. 13/749,595, filed Jan. 24, 2013. Entitled: Seating Assembly With Air Distribution System.

* cited by examiner

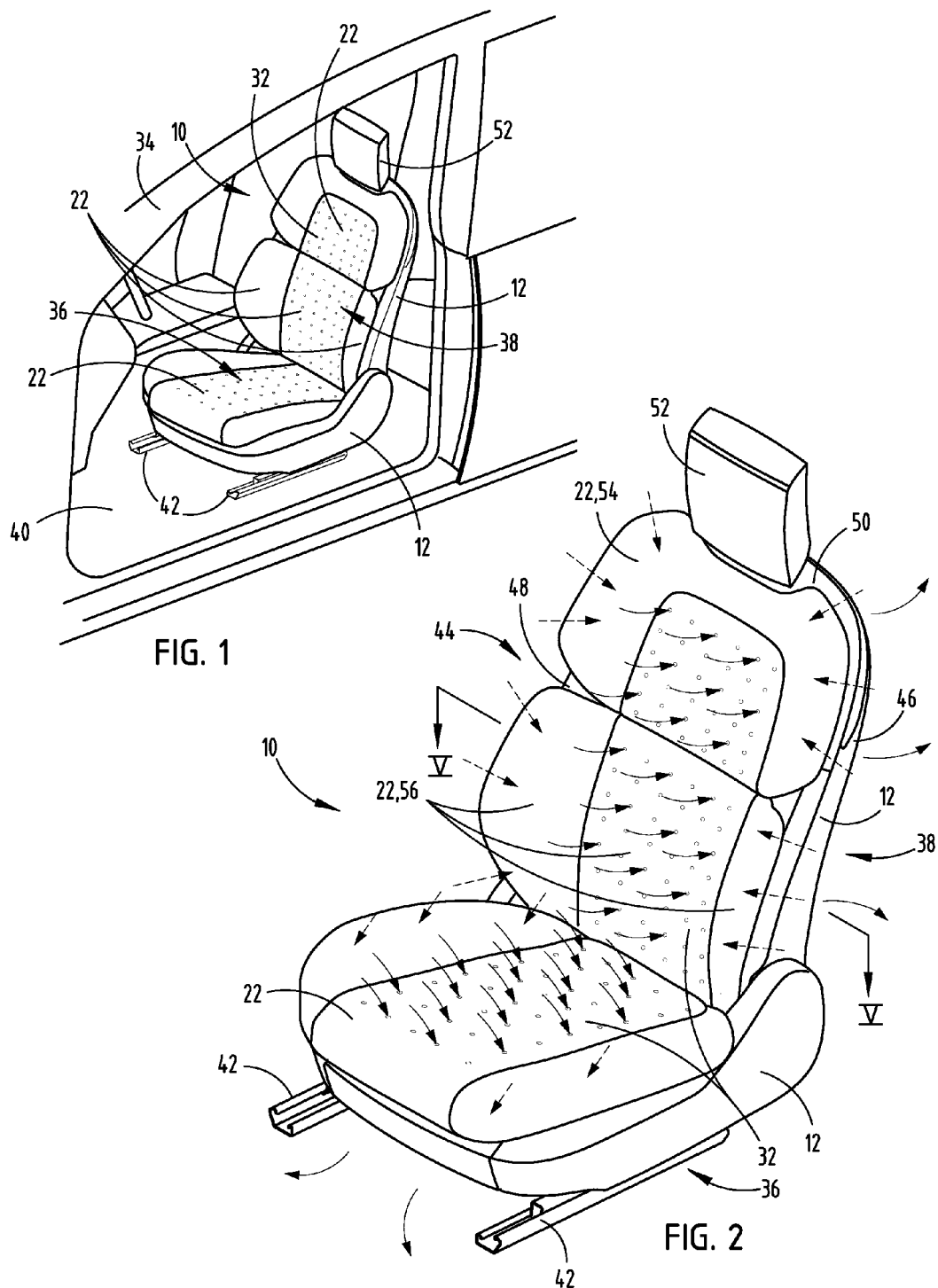

TRIM ATTACHMENT APPARATUS FOR VEHICLE SEATING ASSEMBLY

FIELD OF THE INVENTION

The present invention generally relates to a seating assembly with a trim attachment apparatus, and more specifically, to a vehicle seating assembly that includes a trim attachment apparatus to secure a trim module to the seating assembly.

BACKGROUND OF THE INVENTION

Seating assemblies for vehicles commonly include seatback cushions and seat cushions made of thick and dense foam that are covered with a cover stock material to provide a comfortable surface for the vehicle occupant in a variety of temperature environments and for a number of driver and passenger preferences. Typically, the cover stock material may be stitched into a shell, stretched over the foam cushion and in some instances other portions of the seating assembly, and attached thereto with some type of fastener, making it difficult to remove the cushion or the cover stock material without causing damage. In general, such an arrangement can be difficult to incorporate with ventilation systems for the seating assembly. Furthermore, it is desirable for modern vehicle seating to improve ergonomic support, temperature controls, and air circulation for the seated occupants, while reducing weight of the overall seat.

SUMMARY OF THE INVENTION

According to one aspect of the present invention, a vehicle seating assembly includes a frame structure and a panel coupled with the frame structure. The panel has an occupant support surface. A connection element protrudes from the occupant support surface and borders a predefined area of the occupant support surface. A trim module covers the predefined area and includes an attachment feature extending inward and engaging the connection element to form a seal around the predefined area.

According to another aspect of the present invention, a trim attachment apparatus for a vehicle seating assembly includes a panel having a support surface with an aperture for ventilation. A connection element protrudes from the support surface adjacent to the aperture. A trim module is disposed over the support surface covering the aperture. An attachment feature extends inward from the trim module to engage the connection element and form a seal between the trim module and the panel.

According to yet another aspect of the present invention, a method of assembling a vehicle seating assembly includes providing a panel for the vehicle seating assembly that has a connection element protruding from a support surface of the panel and bordering a predefined area on the support surface. The method further includes providing a trim module for covering the predefined area and having a cover stock and an attachment feature extending inward from the cover stock. The trim module is aligned over the panel and an inward force is applied to the cover stock proximate a portion of the attachment feature to engage a corresponding portion of the connection element. The inward force is applied in a sequential pattern on the cover stock to successively engage a remaining portion of the attachment feature with a corresponding remaining portion of the connection element.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top perspective view of a seating assembly in a vehicle;

FIG. 2 is a top perspective view of the seating assembly that has an ventilation system, showing the air movement;

DETAILED DESCRIPTION OF THE PREFERRED EMBODIMENTS

Figure 3:
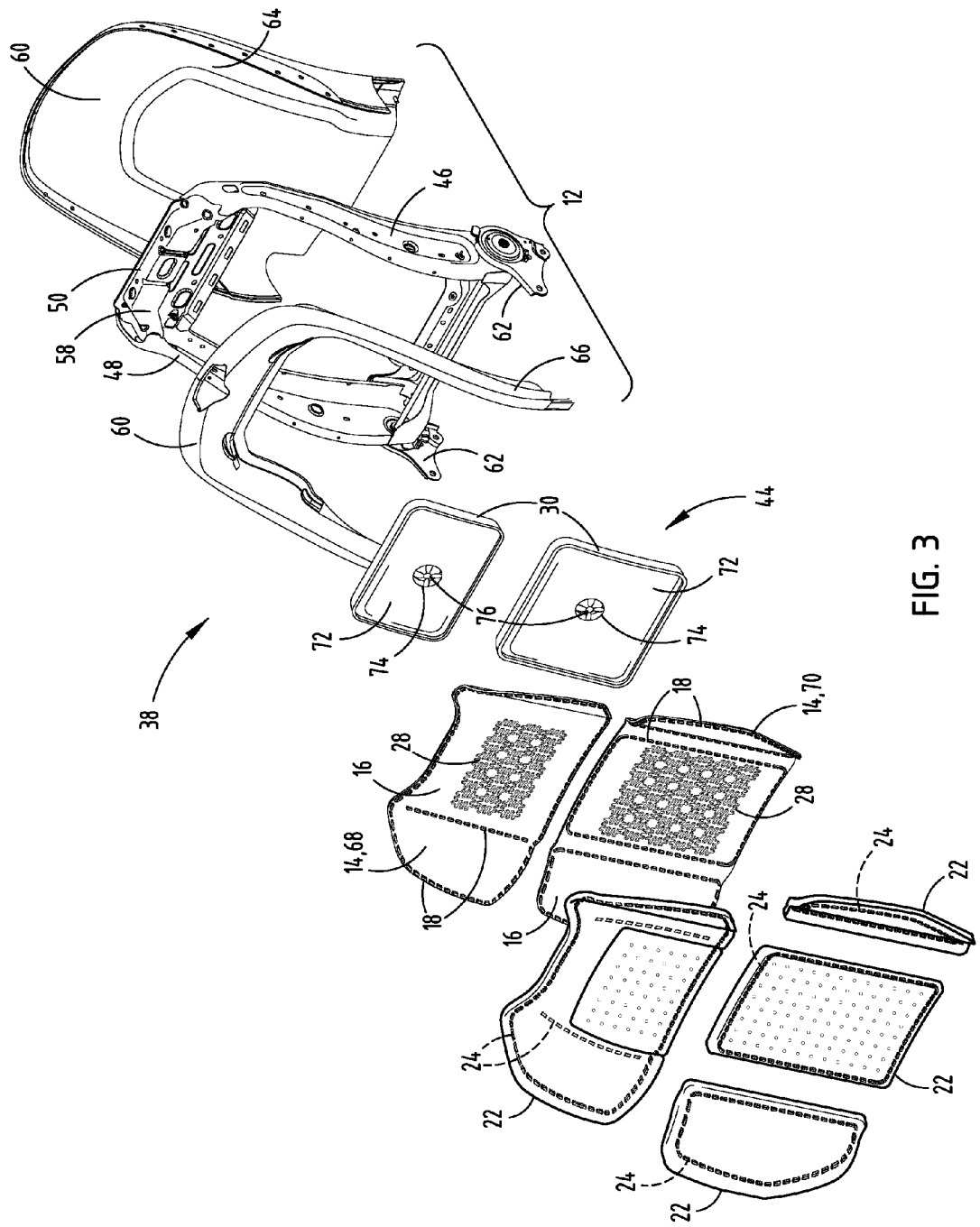
FIG. 3 is an exploded top perspective view of a seatback of the seating assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13, reference numeral 10 generally refers to a vehicle seating assembly that includes a frame structure 12. A support panel 14 is coupled with the frame structure 12 and has an occupant support surface 16. A connection element 18 protrudes from the occupant support surface 16 and borders a predefined area 20 of the occupant support surface 16. A trim module 22 covers the predefined area 20 and includes an attachment feature 24 extending inward and engaging the connection element 18 to form a seal 26 around the predefined area 20. A ventilation aperture 28 extends through the panel 14 within the predefined area 20 and an air movement device 30 is coupled with the panel 14 to draw air through the ventilation aperture 28 from an exterior surface 32 of the trim module 22.

Referring now to the embodiment illustrated in FIG. 1, the seating assembly 10 is positioned in a driver side location of a vehicle 34. It is understood that the seating assembly 10 may be located in various locations throughout the vehicle 34 other than the illustrated location, such as a passenger side location, a mid-row location, and a rear seat location. Further, it is contemplated that the vehicle 34 may be alternatively configured, such as a result of a different vehicle type. The seating assembly 10 includes a seat 36 pivotally coupled with a seatback 38 that is capable of pivotally adjusting between upright and reclined positions relative to the seat 36. The seat 36 is slidably coupled with a floor 40 of the vehicle about a track assembly 42. The track assembly 42 is configured to allow the seating assembly 10 to be adjusted in a forward and rearward direction relative to the floor 40 of the vehicle 34. It is also conceivable that the seating assembly 10 may not include the reclining feature and may not include the track assembly 42, such that the seat 36 may be fixedly or otherwise coupled with the floor 40 or other portion of the vehicle 34.

As shown in FIG. 2, one embodiment of the seating assembly 10 includes a ventilation system 44 that draws air from the exterior surface 32 of the trim modules 22 to provide a cooling effect for a seated occupant. The ventilation system 44 may include at least one air movement device 30 (FIG. 3) to effectuate the movement of air drawn from the exterior surface 32, shown as arrows in FIG. 2. The ventilation system 44 may include alternative embodiments, as generally disclosed in U.S. patent application Ser. No. 13/749,595, entitled "SEATING ASSEMBLY WITH AIR DISTRIBUTION SYSTEM," filed on Jan. 24, 2013, the entire disclosure of which is hereby incorporated by reference.

The embodiment of the seatback 38 illustrated in FIG. 2 includes a frame structure 12 having a first side member 46 and a second side member 48 each pivotally coupled with a frame structure 12 of the seat 36. The first and second side members 46, 48 extend upward from the pivotal connection with the seat frame structure 12 to integrally attach with a top cross member 50 that supports a head restraint 52. It is also conceivable that the head restraint 52 may be integrated into the seatback 38 or otherwise omitted from the seating assembly 10. The seatback 38 also has four trim modules 22 coupled with a forward facing surface of the seatback frame structure 12, with one module defining an upper back support section 54 and three trim modules arranged to define a lower back support section 56. Similarly, the seat 36 has a trim module 22 coupled with an upward facing surface of the seat frame structure 12. The trim modules 22 may be alternatively divided, shaped, and arranged to cover the seatback 38 and the seat 36 for providing surfaces to support an occupant. It is also contemplated that a suspension assembly may integrated with the trim modules 22 or attached between the trim modules 22 and the seatback and seat frame structures 12, allowing the trim modules 22 to be potentially movable or resilient relative to the seat or seatback frame structures 12.

As illustrated in FIG. 3, the seatback frame structure 12 includes a core frame member 58 and a trim shroud 60 configured to substantially enclose the core frame member 58. The core frame member 58 couples with recliner brackets 62 proximate the lower ends of the side members 46, 48, such that the recliner brackets 62 are configured to couple with a rearward portion of the seat frame structure (FIG. 3A) to provide the pivotal movement of the seatback 38 relative to the seat 36. The first and second side members 46, 48 are substantially parallel with each other and curve upward and rearward from the recliner brackets 62 to provide a curved shape that is more robust proximate the recliner brackets 62 and tapers proximate the top cross member 50 that extends orthogonally between the first and second side members 46, 48. The trim shroud 60 includes a rear enclosure 64 and a front enclosure 66. The rear enclosure 64 couples with the core frame member 58 to substantially conceal a rear portion of the seatback frame structure 12. The front enclosure 66 has a U-shape that conforms to and substantially conceals a front portion of the seatback frame structure 12, allowing a central area of the seatback 38 to remain exposed for receiving the support panel 14, trim modules 22, and other internal components of the seatback 38. The front enclosure 66 in the illustrated embodiment also provides attachment points for securing the support panels 14 to the seatback frame structure 12. It is conceivable that the core frame member 58 or portions thereof may be integrated with the trim shroud 60 to provide an alternative frame structure.

Further, as shown in the embodiment illustrated in FIG. 3, the trim modules 22 are positioned to couple with the support surfaces 16 of an upper support panel 68 and a lower support panel 70 that correspond to the upper back support section 54 and the lower back support section 56 of the seatback 38 (FIG. 2). The support panels 68, 70 are also arranged for a rearward facing surface thereof to couple respectively with an upper and lower air movement device 30 of the ventilation system 44. The upper and lower air movement devices 30 each have a concave shell 72 with a cavity facing forward to engage the rearward facing surface of the upper and lower support panels 68, 70. A circular opening is 74 formed in a central region of the concave shell 72 and includes a fan 76 operably coupled therein. It is contemplated that an air movement device may be employed on other portions of the seatback 38, including proximate other predefined areas 20, such as rearward the lateral side bolster areas 80 (FIG. 4).

Figure 3A:
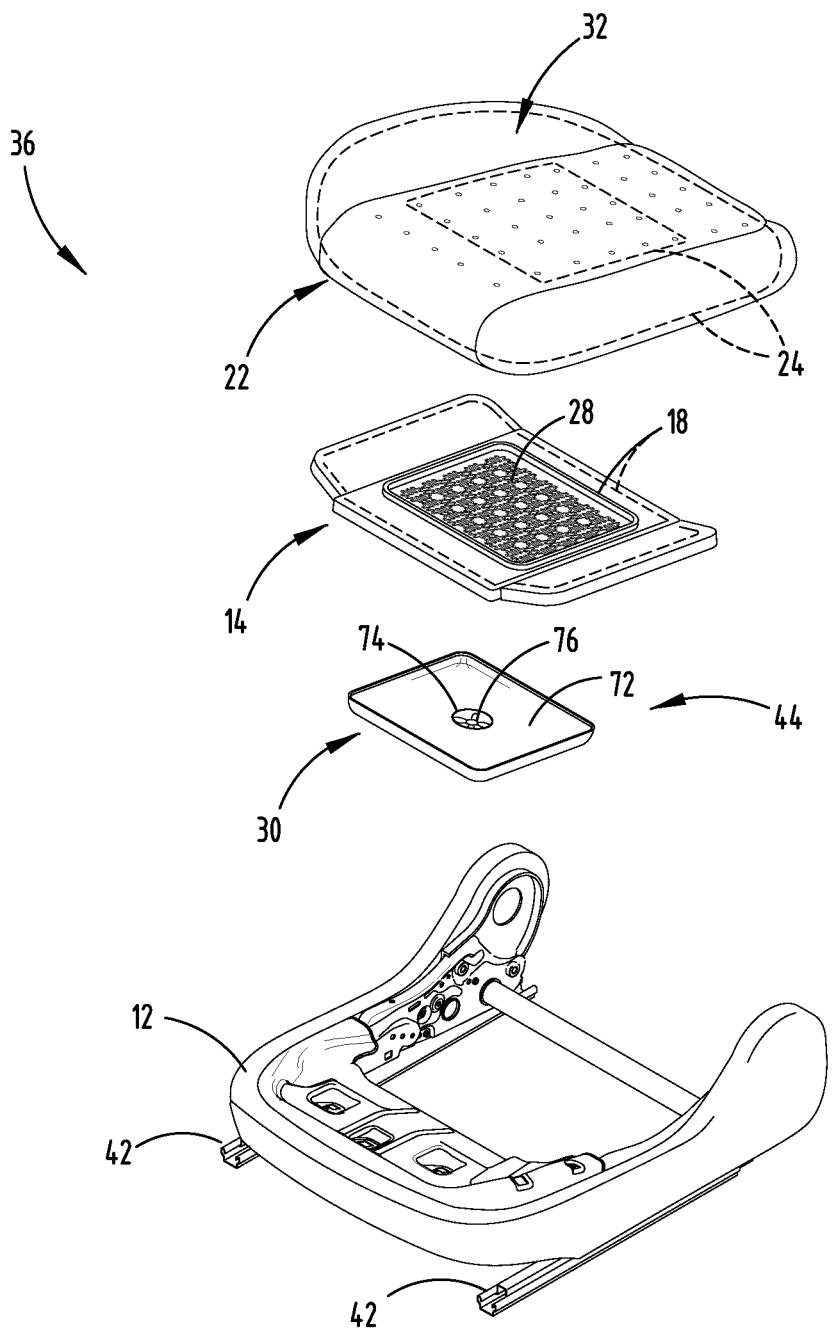
FIG. 3A is an exploded top perspective view of a seat of the seating assembly.

The seat 36, as shown in FIG. 3A, has a substantially similar arrangement to the seatback 38 and includes a seat frame structure 12 with a central area exposed for receiving the support panel 14, the trim module 22, and other internal components of the seat 36. Also, the support panel 14 is arranged to couple with the seat air movement device 30 of the ventilation system 44. The air movement device 30 is similarly constructed to those employed in the seatback 38, whereby it has a concave shell 72 that engages a bottom surface of the support panel 14, for drawing air from the exterior surface 32 of the trim module 22 covering the seat 36. The fans 76 of the air movement devices 30 operate to create a pressure drop within the concave shell 72 and the predefined area 20 (FIG. 4) that draws air from the exterior surface 32 of the trim modules 22. It is contemplated that the seat 36 or seatback 38 may not include the illustrated trim module 22 and support panel 14 and may otherwise include a seat pan for supporting a seat cushion without the ventilation system.

Figure 4:
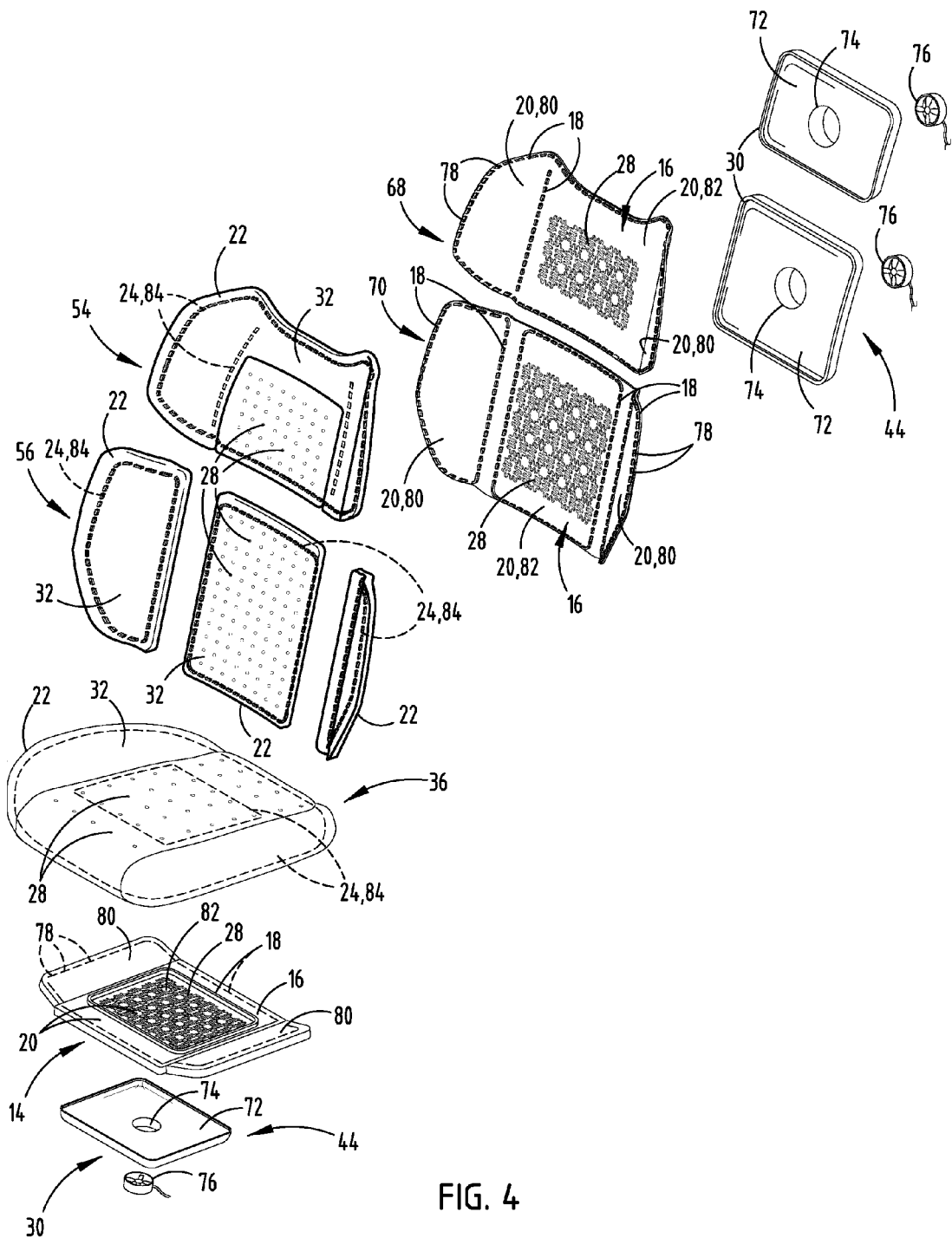
FIG. 4 is an exploded top perspective view of trim modules, support panels, and air movement devices of the seatback and the seat.

As illustrated in FIG. 4, the support panels 14 each include the connection element 18 that integrally protrudes from the occupant support surface 16 and surrounds the one or more predefined areas 20 on the occupant support surface 16. In the illustrated embodiment, the connection element 18 has a plurality of engagement members 78 that are linearly arranged on the support surface 16 to surround the predefined area 20. More specifically, the upper support panel 68 of the seatback 38 has three predefined areas 20, including two lateral side bolster areas 80 and a central area 82. A single row of engagement members 78 divide the central area 82 from the side bolster areas 80. The lower support panel 70 of the seatback 38 also has three predefined areas 20, including two lateral side bolster areas 80 and a central area 82. The lateral side bolster areas 80 on the lower support panel 70 are spaced from the central area 82, such that a row of engagement members 78 separately surrounds each of the central area 82 and the side bolster areas 80. The central areas 82 of both the upper and lower support panels 68, 70 include a plurality of ventilation apertures 28 extending through the panel 14 to provide ventilation to the occupant support surface 16. The plurality of ventilation apertures 28 are arranged in a pattern of various sized and shaped openings that are configured to retain the strength of the panel 14 to support a rearward force of an occupant and provide some added resiliency to the panel proximate the ventilation apertures 28. It is contemplated that the plurality of ventilation apertures 28 may be arranged in several varied patterns that utilized openings with alternative sizes, shapes, and spacing.

As also shown in FIG. 4, the trim modules 22 each have an attachment feature 24 extending orthogonally inward toward the respective support panel 14. In this illustrated embodiment the attachment features 24 have an elongated rib 84 protruding rearward and extending around the rear surface of the trim module 22 in a pattern corresponding to the associated connection element 18 on the respective support panel 14. Accordingly, the elongated rib 84 is similarly formed to surround the predefined area 20 defined and outlined by the associated connection element 18. For the trim module 22 that corresponds to the upper back support section 54, the attachment features 24 are arranged to protrude rearward from an edge portion of the trim module 22 and along two rows that extend vertically to correlate with connection elements 18 that divide the central area 82 and the lateral side bolster areas 80 on the upper support panel 68. However, the three trim modules 22 that define the lower back support section 56 each have an attachment feature 24 that protrudes rearward along an edge portion of each trim module 22 to surround the trim modules 22.

With further reference to FIG. 4, the seat 36 of the illustrated embodiment has a support panel 14 with the predefined central area 82 and a predefined surrounding area that encompasses the lateral side bolsters 80. Both the central and predefined surrounding areas have separate rows of connection elements 18 that protrude from the support panel 14 and surround each area. The central area 82 includes a plurality of ventilation apertures 28 extending through the panel 14 to provide ventilation to the occupant support surface 16, similar to the central areas 82 of the upper and lower support panels 68, 70 of the seatback 38. The trim module 22 for the seat 36 also has a corresponding attachment feature 24 extending downward in a shape that conforms to the connection elements 18 surrounding the predefined areas 20.

Figure 4A:
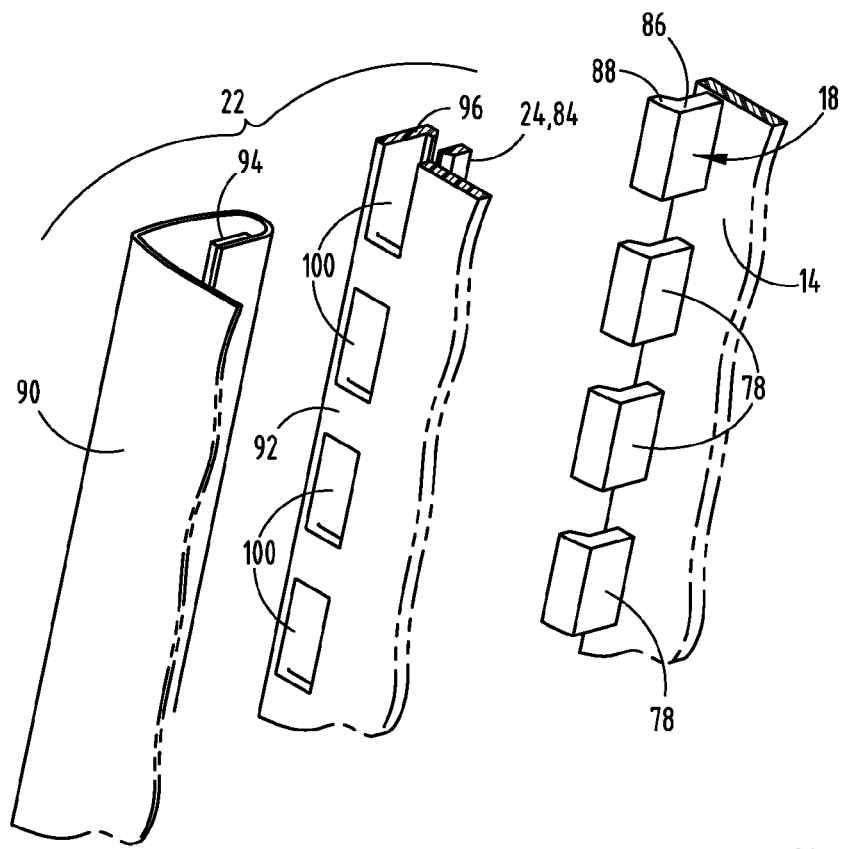
FIG. 4A is an exploded front top perspective view of an edge section of the trim module and the support panel of the seatback.
Figure 4B:
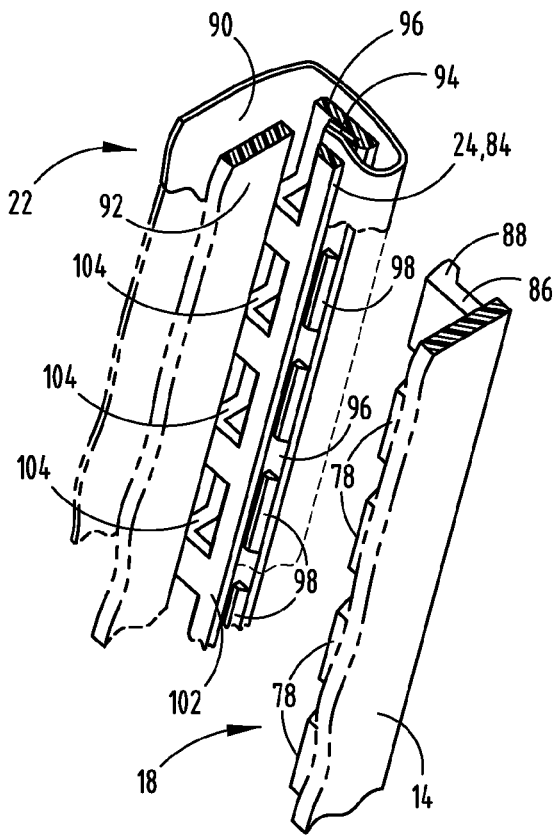
FIG. 4B is an exploded rear top perspective view of the edge section of the trim module and the support panel of the seatback.

One embodiment of the connection element 18 is shown in FIGS. 4A-4B as a sectional view taken from the edge portion of the seatback support panel 14. It is understood that the illustrated edge portion may be similarly arranged on various portions of the upper and lower support panels 68, 70 and on other support panels 14 (FIGS. 3-3A). It is also understood that the illustrated edge portion may continue around the entire support panel 14. In this embodiment, the connection element 18 has a substantially L-shaped cross section with a base portion 86 orthogonally extending from the support panel and an end portion 88 extending orthogonally from a distal end of the base portion 86 in general alignment with the support panel 14. The support panel 14 and the engagement members 78 are integrally formed from a generally rigid polymeric material capable of resiliently flexing. Although, it is contemplated that the support panels 14 may be made from other materials having similar rigid and resilient characteristics.

As also shown in FIGS. 4A-4B, one embodiment of the attachment feature 24 is disposed on the edge portion of the trim module 22 that attaches to the illustrated edge portion of the support panel 14. The trim module 22 includes a cover stock 90 and a rigid liner 92 spanning a rear surface of the cover stock 90. The rigid liner 92 is permeable to allow air to pass from the cover stock 90 to the support panel 14, whereby the rigid liner 92 may also have air holes and may not cover the entire rear surface of the cover stock 90 to similarly allow for air flow. The cover stock 90 has a retention member 94 coupled with a distal edge of the cover stock 90 that wraps over and couples with an exterior edge 96 of the rigid liner 92, as shown in FIG. 4B. The retention member 94 may be extruded, sewn, or otherwise attached to the distal edge of the cover stock 90 around the entire piece of cover stock, such that the retention member 94 is configured to engage lip segments 98 that protrude inward from the exterior edge 96 for retaining the cover stock 90 to the rigid liner 92. To provide a space for the retention member 94 and the distal edge of the cover stock 90 to be inserted and attached to the exterior edge 96 of the rigid liner 92, the attachment feature 24 is disposed inward from the rigid liner 92 at a spaced distance away from the exterior edge 96 of the rigid liner 92. A number of holes 100 are also formed through the support panel 14 in the space between the exterior edge 96 and the attachment feature 24. The attachment feature 24, more specifically, includes an elongated rib 102 that protrudes orthogonally from the support panel 14 and has a series of openings 104 in a sidewall of the elongated rib 102. The openings 104 are spaced along the elongated rib at corresponding spacing and sizes to the engagement members 78 protruding in the opposing direction from the support panel 14.

Figure 5:
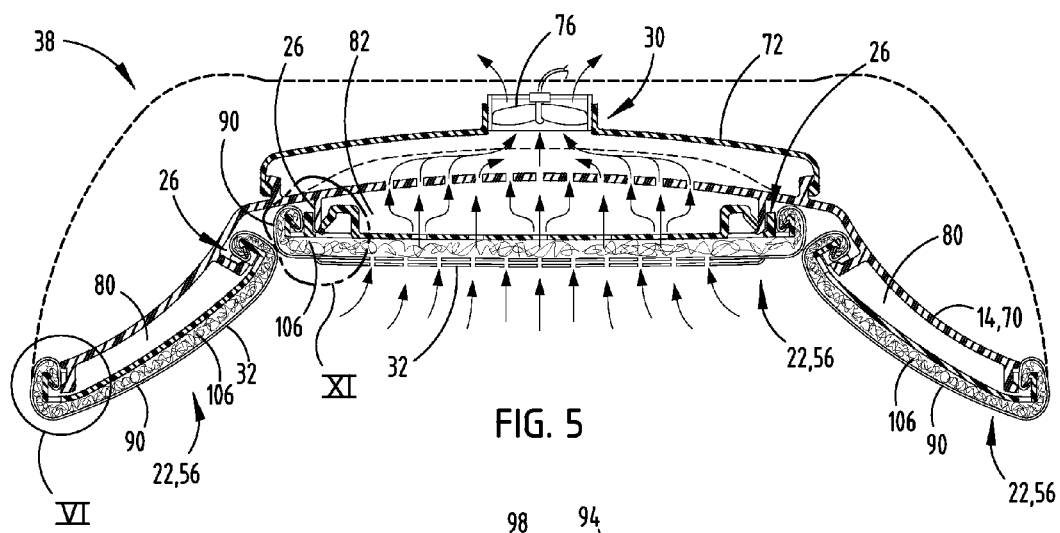
FIG. 5 is a cross-sectional view of the seatback, taken at line V-V of FIG. 2.

Referring now to FIG. 5, a cross section of the lower back support section 56 of the seatback 38 is shown with the three trim modules 22 attached to the lower support panel 70 and the air movement device 30 drawing air from the exterior surface of the cover stock 90 proximate the central predefined area 82 of the support panel 14. The trim modules 22 have a permeable cushion 106 disposed between the cover stock 90 and the rigid liner 92 (FIG. 6) that allows the air to be drawn from the exterior surface 32. The permeable cushion 106 includes a resilient structure of woven fibers that have open areas to allow for air ventilation and passage. However, it is conceivable that the permeable cushion 106 may include air permeable open cell foam, air permeable closed cell foam, or other conceivable flexible and breathable materials that cushion the support panel 14. Accordingly, the cover stock 90 is comprised of a breathable material that is disposed over the permeable cushion 106 to provide additional support to hold the permeable cushion 106 against the trim carrier rigid liner 92. The cover stock 90 may conceivably include a fabric material, a perforated leather material, a vinyl material, or other conceivable air permeable seating upholstery materials.

Figure 6:
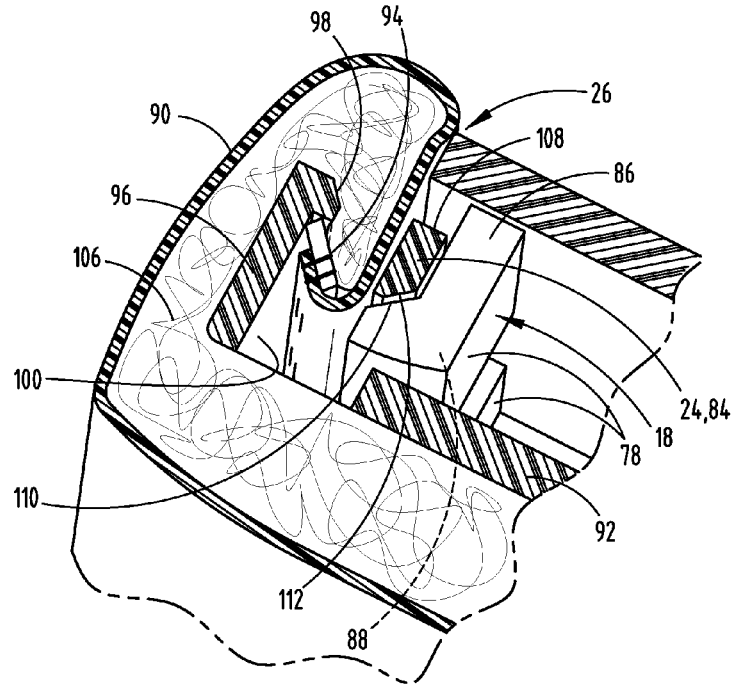
FIG. 6 is an enlarged top perspective view of an edge section of the seatback, taken at section VI of FIG. 5.

As shown in FIG. 6, at least one of the plurality of engagement members 78 of the connection element 18 is removably engaged with one of the series of openings 104 (FIG. 4B) on the elongated rib 84 of the attachment feature 24. To effectuate engagement, an installer may apply a force that is generally perpendicular to the exterior surface 32 of the cover stock 90 proximate a portion of the attachment feature 24 to engage a corresponding and abutting portion of the connection element 18. This perpendicular force causes the engagement member 78 to flex inward away from the elongated rib 102 and the elongated rib 102 may similarly flex outward to allow the end portion 88 of the engagement member 78 to pass beyond an outer edge 108 of the sidewall before frictionally engaging within the opening 104 in the sidewall. Upon engaging one of the plurality of engagement members 78 on the support panel 14 with one of the series of openings 104, a similar perpendicular force then is applied sequentially in a pattern on the cover stock 90 to successively engage the remaining plurality of engagement members 78 with the corresponding remaining series of openings 104. For example, the sequential application of the perpendicular force may be accomplished by moving an installer's hand around the edge portion of a trim module 14 while maintaining a generally perpendicular force against the exterior surface 32 of the cover stock 90. Attachment of each engagement member 78 with a corresponding opening 104 in the sidewall of the elongated rib 102 provides an audible and tactile feedback to the installer, such that the installer is made aware of whether the attachment feature 24 is fully engaged with the connection element 18 for each trim module 22.

In the embodiment shown in FIG. 6, the seal 26 is formed at least between the cover stock 90 and the side edge of the support panel 14. Upon fully engaging the attachment feature 24 with the connection element 18, the seal 26 between the trim module 22 and the support panel 14 is formed to form a substantially airtight connection around the periphery of each trim module 22. The seal 26 generally prevents air from being drawn by the air movement device 30 from portions of the exterior surface 32 of the cover stock 90 outside the predefined ventilation area, namely the central area 82 in the illustrated embodiment. As also shown in FIG. 6, the end portion 88 of the engagement member 78 has a declined angled surface 110 that abuts a corresponding chamfered edge 112 of the opening 104. The declined angled surface 110 and the chamfered edge 112 allow for easier removability of the trim module 22 from the support panel 14.

Figure 7:
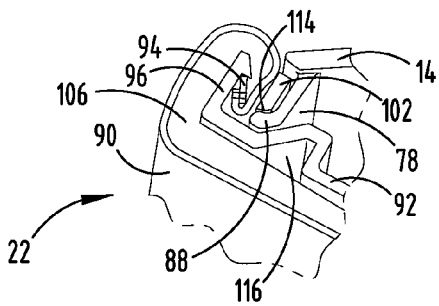
FIG. 7 is an enlarged top perspective view of an additional embodiment of the edge section of the seatback.
Figure 7A:
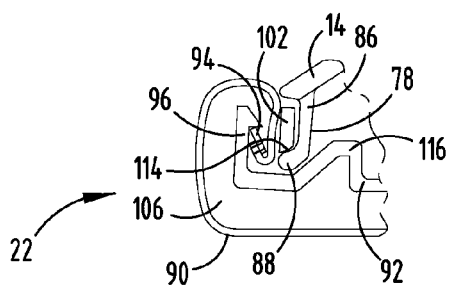
FIG. 7A is a cross-sectional view of the edge section shown in FIG. 7.

Referring now to the alternative embodiment shown in FIGS. 7-7A, the end portion 88 of the engagement member 78 has a bulbous end that frictionally engages against a curved edge surface 114 of the opening 104 of the series of openings in the elongated rib 102. Also, this embodiment includes a ramped protrusion 116 extending inward adjacent to the engagement member 78, such that a ramped surface on the ramped protrusion 116 guides the engagement member 78 outward and into engagement with the opening 104. This alternative embodiment, along with others described and illustrated, may be taken from an edge portion on the upper back support panel or other support panels.

Figure 8:
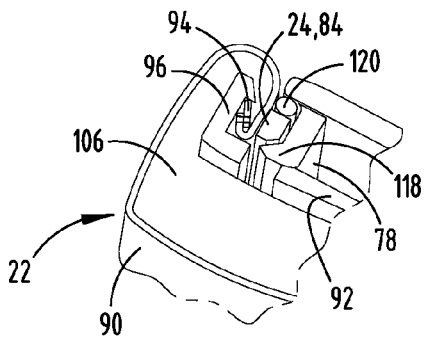
FIG. 8 is an enlarged top perspective view of an additional embodiment of the edge section of the seatback.
Figure 8A:
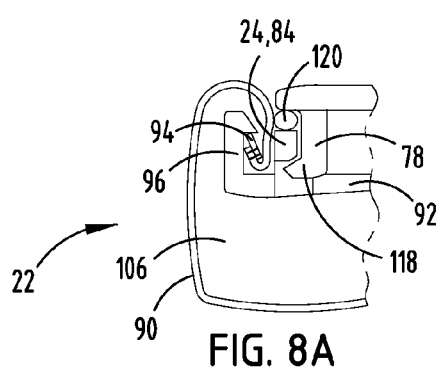
FIG. 8A is a cross-sectional view of the edge section shown in FIG. 8.

Another alternative embodiment, as shown in FIGS. 8-8A, includes a dual angled end portion 118 that has angled surfaces configured for the engagement member 78 to more easily slide past the outer edge 108 of the elongated rib 102 (FIG. 4B) in both the engagement upon installation and disengagement upon removal of the trim module 22 with the support panel 14. This alternative embodiment also illustrates a resilient seal element 120 coupled with the outer edge 108 of the elongated rib 102. The seal element 120 may extend continuously along the elongated rib 102 around the predefined area 20. Upon frictional attachment of the engagement member 78 with the opening 104 in the sidewall of the elongated rib 102, the resilient seal element 120 is configured to compress against the support panel 14 to form the seal 26 around the ventilation apertures 28. The compression of the resilient seal element 120 reduces the desire for the cover stock 90 to also form the seal 26 with the support panel 14.

Figure 9:
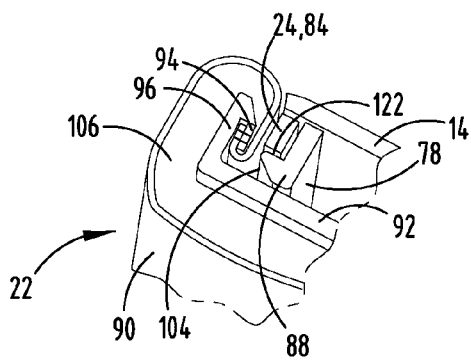
FIG. 9 is an enlarged top perspective view of an additional embodiment of the edge section of the seatback.
Figure 9A:
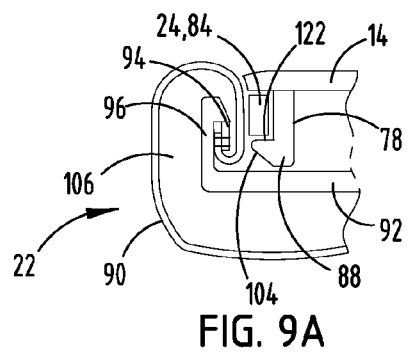
FIG. 9A is a cross-sectional view of the edge section shown in FIG. 9.
Figure 10:
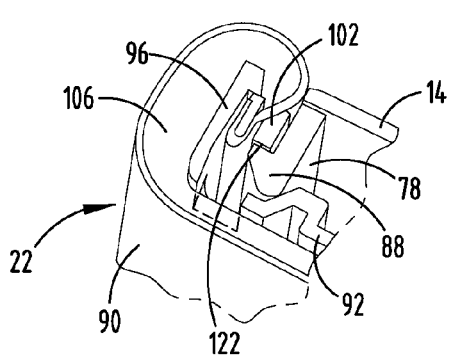
FIG. 10 is an enlarged top perspective view of an additional embodiment of the edge section of the seatback.
Figure 10A:
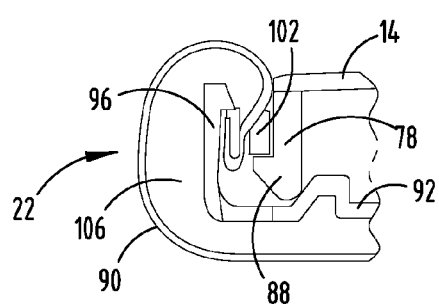
FIG. 10A is a cross-sectional view of the edge section shown in FIG. 10.

As also illustrated in FIGS. 9-10A, two other embodiments are shown. With respect the embodiment shown in FIGS. 9-9A, the end portion 88 of the engagement member 78 includes a generally perpendicular surface 122 for engaging the opening 104 that is formed to have a similarly aligned surface to abut the perpendicular surface 122, such that the trim module 22 is more rigidly attached to the support panel 14. Further, with regard to the embodiment shown in FIGS. 10-10A, the end portion 88 of the engagement member 78 has the perpendicular surface 122 and also has the ramped protrusion 116, as in the embodiment shown in FIGS. 7-7A. Accordingly, it is contemplated that the attachment feature and connection element may include any of the alternative embodiments illustrated herein or any combination thereof. Further, it is contemplated that the connection element may alternatively include the elongated rib that borders the predefined area and thereby the attachment feature may include the plurality of engagement members that frictionally engage a sidewall of the elongated rib.

Figure 11:
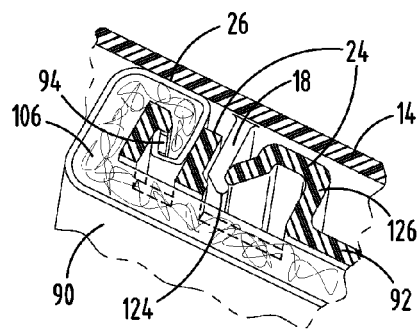
FIG. 11 is an enlarged top perspective view of an interior section of the seatback, taken at section XI of FIG. 5.
Figure 11A:
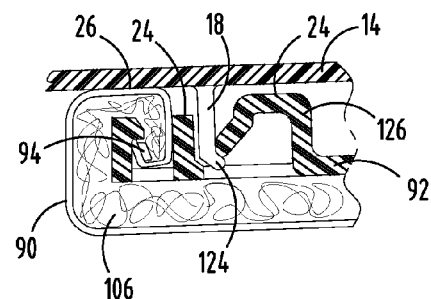
FIG. 11A is a cross-sectional view of the interior section shown in FIG. 11.

Referring now to FIGS. 11-11A, showing an interior portion of the support panel 14, specifically showing the edge portion of the trim module 22 that attaches to the lower back support panel 70 adjacent to and covering the central area 82 of the support surface 16 (FIG. 4). As shown, the attachment feature 24 includes a hook-shaped member 126 that protrudes inward toward the support panel 14 and curves outward back toward the trim module 22 to engage a distal end 124 of the connection element 18. The distal end 124 of the connection element 18 likewise angles toward the hook-shaped member 126 of the attachment feature 24 to frictionally engage therewith. On the opposing side of the connection element 18 the elongated rib 102 provides support to prevent the connection element 18 from easily flexing outward away from the hook-shaped member 126 and disengaging therefrom. In this embodiment the elongated rib 102 is not necessarily engaged by engagement members 78. Also, the seal 26 in this embodiment is substantially formed between the support surface 16 of the support panel 14 and the exterior surface of the cover stock 90.

Figure 12:
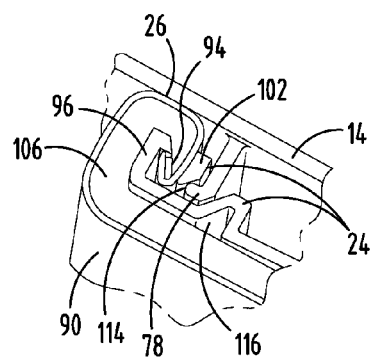
FIG. 12 is an enlarged top perspective view of an additional embodiment of an interior section of the seatback.
Figure 12A:
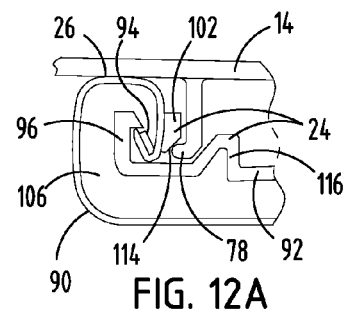
FIG. 12A is a cross-sectional view of the interior section shown in FIG. 12.
Figure 13:
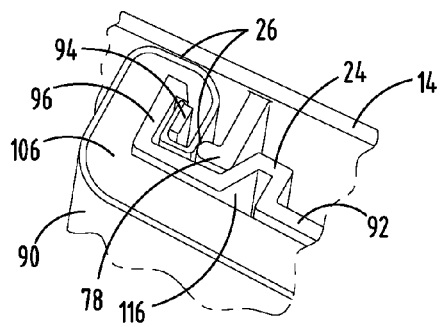
FIG. 13 is an enlarged top perspective view of an additional embodiment of an interior section of the seatback.
Figure 13A:
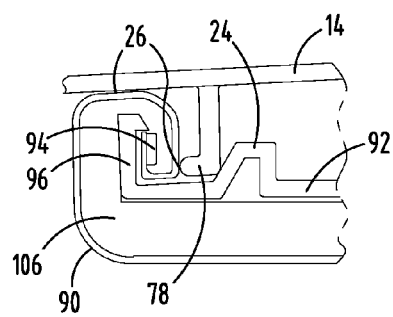
FIG. 13A is a cross-sectional view of the interior section shown in FIG. 13.

As illustrated in FIGS. 12-13A, alternative embodiments of the attachment feature 24 and the connection element 18 are shown taken from a similar location as shown in FIGS. 11-11A. With respect to FIGS. 12-12A, the connection element 18 and the attachment feature 24 are similarly arranged to the embodiment shown in FIGS. 7-7A and accordingly includes like numerals for like parts thereof. However, the seal 26 in this embodiment is substantially formed in a similar location to the embodiment shown in FIGS. 11-11A. With respect to FIGS. 13-13A, the illustrated embodiment does not include the elongated rib 102, and instead the engagement member 78 engages directly with the exterior surface 32 of the cover stock 90, compressing the cover stock 90 against exterior edge 96 of the rigid liner 92 to form an additional seal 26. The engagement member 78 is also held against the cover stock 90 by the ramped surface of the ramped protrusion 116 extending inward from the rigid liner 92. Again, it is conceivable the attachment features and connection elements may include any of these alternative embodiments illustrated or any combination thereof.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle seating assembly, comprising:
   a frame structure;
   a panel coupled with the frame structure and having an occupant support surface;
   a connection element protruding forward from the occupant support surface and bordering a predefined area of the occupant support surface; and
   a trim module covering the predefined area and including an elongated rib extending rearward and engaging the connection element to form a seal around the predefined area.

2. The vehicle seating assembly of claim 1, wherein the panel includes a plurality of ventilation apertures extending through the panel within the predefined area to provide ventilation to the occupant support surface.

3. The vehicle seating assembly of claim 1, wherein the trim module includes a cover stock and a permeable cushion between the cover stock and the panel, and wherein the panel includes at least one ventilation aperture extending through the panel within the predefined area.

4. The vehicle seating assembly of claim 3, further comprising:
   an air movement device coupled with an inner surface of the panel to draw air through the at least one ventilation aperture from an exterior surface of the cover stock, wherein the seal is substantially airtight to prevent air from being drawn from outside the predefined area.

5. The vehicle seating assembly of claim 1, wherein the elongated rib extends around the predefined area, and wherein the connection element is arranged to removably engage the elongated rib at multiple locations around the predefined area to define the seal between the trim module and the panel.

6. The vehicle seating assembly of claim 1, wherein the elongated rib includes a series of openings in a sidewall of the elongated rib, and wherein the connection element includes a plurality of engagement members that frictionally engage the series of openings.

7. The vehicle seating assembly of claim 1, wherein the panel includes a rigid polymeric material and the connection element includes a select one of an elongated rib and a plurality of engagement members that integrally protrude from the panel and extend around the predefined area.

8. The vehicle seating assembly of claim 1, wherein the trim module includes a cover stock, a rigid liner spanning a rear surface of the cover stock, and a retention member coupled with a distal edge of the cover stock that wraps over and couples with an exterior edge of the rigid liner, and wherein the elongated rib extends inward from the rigid liner.

9. A trim attachment apparatus for a vehicle seating assembly, comprising:
   a panel having a support surface with an aperture for ventilation;
   a connection element protruding forward from the support surface adjacent to the aperture;
   a trim module disposed over the support surface covering the aperture; and
   an elongated rib extending rearward from the trim module to engage the connection element and form a seal between the trim module and the panel.

10. The trim attachment apparatus of claim 9, wherein the elongated rib includes a plurality of engagement members bordering the aperture.

11. The trim attachment apparatus of claim 9, wherein the elongated rib surrounds the aperture, and wherein the connection element removably engages the elongated rib successively at multiple locations around the aperture to form the seal.

12. The trim attachment apparatus of claim 9, wherein the elongated rib has a sidewall and a series of openings in the sidewall, and wherein the connection element includes a plurality of engagement members spaced along the support panel to frictionally engage the series of openings in the elongated rib.

13. The trim attachment apparatus of claim 9, wherein the elongated rib borders the aperture and has a body portion adjacent to the trim module and an edge portion away from the body portion, and wherein the connection element engages the body portion.

14. The trim attachment apparatus of claim 13, further comprising:
a resilient seal element coupled with the edge portion of the elongated rib that compresses against the support surface to form the seal around the aperture.

15. The trim attachment apparatus of claim 9, wherein the trim module includes a cover stock and a permeable cushion between the cover stock and the panel, and wherein an air movement device is coupled with an inner surface of the panel to draw air through the aperture from an exterior surface of the cover stock.

16. The trim attachment apparatus of claim 15, wherein the elongated rib surrounds the aperture to define a ventilation area on the support surface, and wherein the seal prevents air from being drawn by the air movement device from outside the ventilation area.

17. A method, comprising:
providing a panel for a vehicle seating assembly that includes a connection element protruding from a support surface of the panel and bordering a predefined area on the support surface;
providing a trim module for covering the predefined area and having a cover stock and an elongated rib extending rearward from the cover stock;
aligning the trim module over the panel;
applying an inward force to the cover stock proximate a portion of the elongated rib to engage a corresponding portion of the connection element; and
applying the inward force in a sequential pattern on the cover stock to successively engage a remaining portion of the elongated rib with a corresponding remaining portion of the connection element.

18. The method of claim 17, wherein the elongated rib and the connection element engage to form a substantially airtight seal between the trim module and the panel.

19. The method of claim 17, wherein the panel includes a plurality of ventilation apertures extending through the panel within the predefined area to provide ventilation to the support surface, and wherein an air movement device is configured to draw air through the plurality of ventilation apertures from an exterior surface of the cover stock.

20. The method of claim 17, wherein the elongated rib borders the predefined area and the connection element includes a plurality of engagement members, and wherein the plurality of engagement members frictionally engage a sidewall of the elongated rib.

* * * * *